(12) United States Patent
Paulin

(10) Patent No.: US 12,459,215 B2
(45) Date of Patent: Nov. 4, 2025

(54) FIRE RESISTANT COMPOSITE POLE

(71) Applicant: Valmont Industries, Inc., Omaha, NE (US)

(72) Inventor: Robert Paulin, Irmo, SC (US)

(73) Assignee: Valmont Industries, Inc., Omaha, NE (US)

( * ) Notice: Subject to any disclaimer, the term of this patent is extended or adjusted under 35 U.S.C. 154(b) by 182 days.

(21) Appl. No.: 18/524,501

(22) Filed: Nov. 30, 2023

(65) Prior Publication Data
US 2024/0093524 A1    Mar. 21, 2024

Related U.S. Application Data

(62) Division of application No. 17/013,908, filed on Sep. 8, 2020, now Pat. No. 11,879,258.

(60) Provisional application No. 62/900,693, filed on Sep. 16, 2019.

(51) Int. Cl.
| | |
|---|---|
| B29C 70/32 | (2006.01) |
| B29C 70/54 | (2006.01) |
| E04B 1/94 | (2006.01) |
| B29K 105/08 | (2006.01) |
| B29K 309/08 | (2006.01) |
| B29L 31/00 | (2006.01) |
| E04H 12/02 | (2006.01) |

(52) U.S. Cl.
CPC ............ *B29C 70/32* (2013.01); *B29C 70/545* (2013.01); *E04B 1/94* (2013.01); *B29K 2105/08* (2013.01); *B29K 2309/08* (2013.01); *B29K 2995/0016* (2013.01); *B29L 2031/766* (2013.01); *E04H 12/02* (2013.01)

(58) Field of Classification Search
CPC ...................................................... B29C 70/32
See application file for complete search history.

(56) References Cited

U.S. PATENT DOCUMENTS

| | | |
|---|---|---|
| 3,429,758 A | 2/1969 | Young |
| 3,896,858 A | 7/1975 | Whatley |
| 4,276,332 A | 6/1981 | Castle |

(Continued)

FOREIGN PATENT DOCUMENTS

| | | |
|---|---|---|
| CN | 101935441 A | 7/2011 |
| CN | 104265054 B | 1/2015 |

(Continued)

OTHER PUBLICATIONS

International Search Report and Written Opinion mailed in International Application No. PCT/US20/49633 dated Jan. 15, 2021; 8 pages.

(Continued)

*Primary Examiner* — Jeffry H Aftergut
(74) *Attorney, Agent, or Firm* — Milligan PC LLO

(57) ABSTRACT

The present invention provides an improved fire resistant composite pole and a method for producing the same. In accordance with preferred embodiments, the composite utility pole of the present invention includes a composite structure having integrally bonded layers of resin impregnated fiberglass extending along the length of the pole. According to a preferred embodiment, the composite structure of the pole includes an intumescent layer which includes: high temperature mineral fibers, exfoliating graphite, organic binders. and alumina trihydrate (ATH).

22 Claims, 9 Drawing Sheets

(56) References Cited

U.S. PATENT DOCUMENTS

| | | | |
|---|---|---|---|
| 4,435,242 A | 3/1984 | Mcnulty | |
| 4,493,945 A | 1/1985 | Feldman | |
| 5,326,410 A | 7/1994 | Boyles | |
| 5,513,477 A | 5/1996 | Farber | |
| 5,704,187 A * | 1/1998 | Hosford | E04H 12/02 |
| | | | 52/745.19 |
| 6,123,485 A | 9/2000 | Mirmiran et al. | |
| 7,363,751 B2 | 4/2008 | Copeland et al. | |
| 7,824,583 B2 | 11/2010 | Gang | |
| 8,151,898 B2 | 4/2012 | Merchant | |
| 8,281,547 B2 | 10/2012 | Hettick | |
| 9,016,324 B2 | 4/2015 | Niccolls et al. | |
| 9,410,645 B2 | 8/2016 | Nakamura et al. | |
| 9,447,291 B2 | 9/2016 | Deogon et al. | |
| 9,745,476 B2 | 8/2017 | Anderson et al. | |
| 10,099,450 B1 | 10/2018 | Miller | |
| 2001/0015045 A1 | 8/2001 | Paroly | |
| 2002/0095905 A1 | 7/2002 | Fawley | |
| 2003/0219561 A1 | 11/2003 | Maybee | |
| 2010/0132877 A1 | 6/2010 | Zheng et al. | |
| 2010/0270040 A1 | 10/2010 | Merchant | |
| 2014/0076587 A1 | 3/2014 | Herdman et al. | |
| 2014/0096475 A1 | 4/2014 | Ceko | |
| 2016/0076249 A1 | 3/2016 | Gibson et al. | |
| 2016/0089846 A1 | 3/2016 | McCartney et al. | |
| 2016/0177589 A1 | 6/2016 | Ceko | |
| 2018/0002536 A1 | 1/2018 | Kittle et al. | |
| 2018/0118909 A1 | 5/2018 | Jeromenok et al. | |
| 2019/0119938 A1 | 4/2019 | Sorenson et al. | |

FOREIGN PATENT DOCUMENTS

| | | | |
|---|---|---|---|
| CN | 109572072 A | | 4/2019 |
| JP | 2009-279769 A | * | 12/2009 |
| KR | 200250615 Y1 | | 10/2001 |
| KR | 20030005935 A | | 1/2003 |
| PT | 104301 A | | 7/2011 |
| WO | 9425791 A1 | | 11/1994 |
| WO | 2009112073 A1 | | 9/2009 |
| WO | 2010071466 A1 | | 6/2010 |
| WO | 2016077849 A1 | | 5/2016 |

OTHER PUBLICATIONS

Semiconductor/Graphene Nanocomposites: Synthesis, Characterization, and Applications, Applications of Nanomaterials, (Yousefi et al.) Jun. 22, 2018.

* cited by examiner

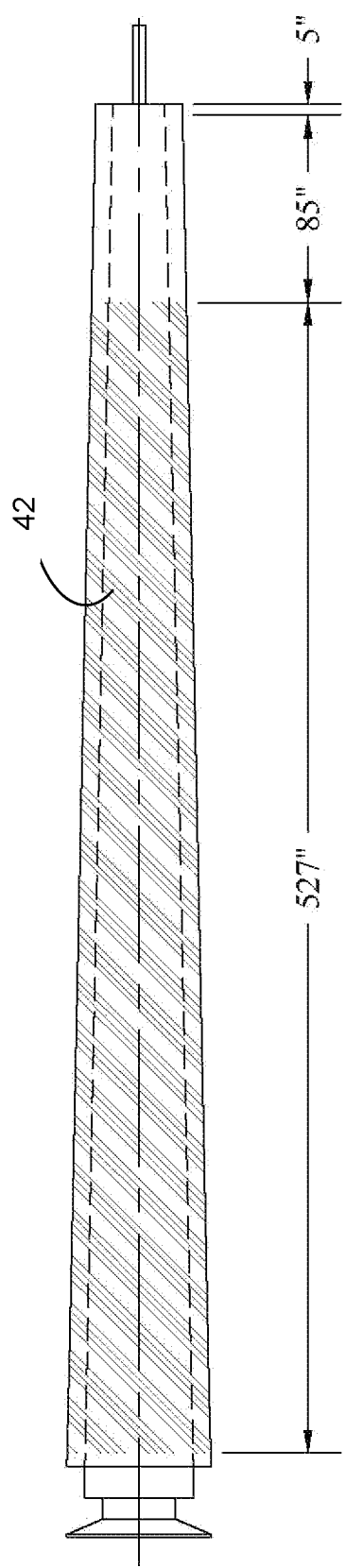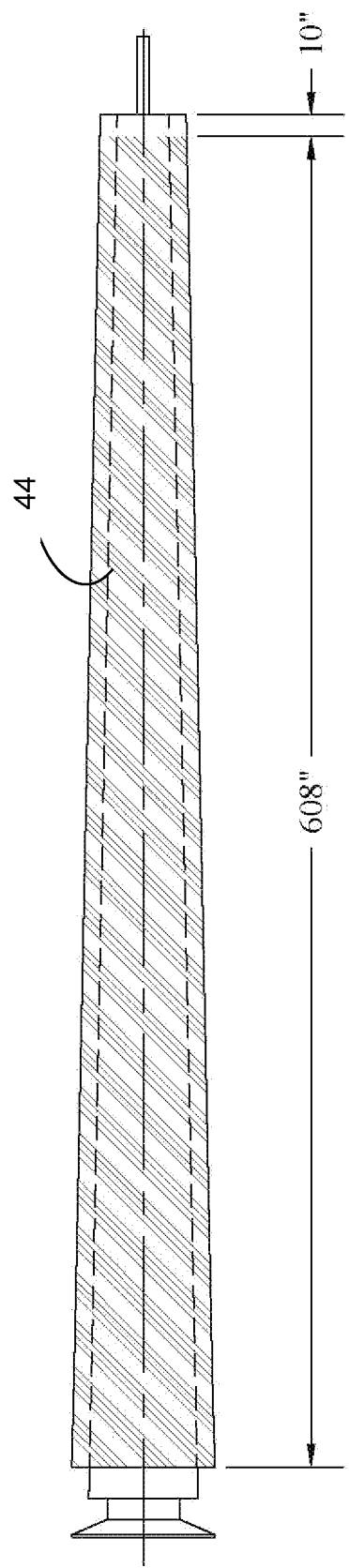
FIG. 5A
FIG. 5B

FIRE RESISTANT COMPOSITE POLE

RELATED APPLICATIONS

The present application is a division of U.S. Non-Provisional application Ser. No. 17/013,908 filed Sep. 8, 2020, which claims priority to U.S. Provisional Application No. 62/900,693 filed Sep. 16, 2019.

FIELD OF THE PRESENT INVENTION

The present invention relates generally to an improved fire-resistant composite pole. More specifically, the present invention relates to an improved fire resistant composite pole which incorporates an intumescent layer within the bonded layers of the pole.

BACKGROUND OF THE INVENTION

Traditional utility poles are single, vertical columns or posts enclosing a central cavity. Utility poles are commonly erected at regular intervals to support overhead power lines and other public utilities such as electrical cable, fiber optic cable, and related equipment such as transformers and street lights. In this capacity, utility poles are inexpensive ways to keep electrical wires and cables from touching the ground, and out of the way of people and vehicles.

Most commonly, utility poles are made of wood which has been pressure treated with a number of toxic chemicals such as pentachlorphenol (Penta), chromated copper arsenate, creosote, copper azole and others. These chemicals are harmful to the environment, and poisonous to humans and animals. Another problem is that the wooden utility poles must be replaced about every ten to twenty years (depending environmental conditions).

Increasingly, composite utility poles used in place wooden utility poles. Composite poles are stronger, less harmful the environment and can last indefinitely. Additionally, composite poles can be formed as hollow cylinders which can act as electrical chases for electrical wires and the like. This use of the pole interior has been increasingly common due to the use of underground distribution lines. The pole interior has also increasingly been used by wireless and cable service companies to mount their equipment above the street surface.

An important limitation in using composite poles is their susceptibility to fire damage. High temperatures around a composite pole can reduce the pole's strength and lifespan. Additionally, high temperatures can damage internal wires and cables. This can result in extensive time and expense to restore electrical power in fire impacted areas. Often, the damage to the utility poles is the critical factor in protecting and restoring electrical power since the underground wiring and the suspended overhead lines are otherwise protected from ground fires.

To protect composite poles from fire, the most common solution is addition of fire-resistant additives to the resin matrix during manufacture. This solution however greatly reduces the cohesion of the resin matrix to the fiberglass. Further, when the resin layer is subject to heat, the fire-resistant compounds expand and further reduce the strength of the pole. Another alternative is to apply a fireproofing coating to the outside of a fully formed pole. However, to be effective, this solution requires several passes through a painting booth and then requires an additional aesthetic coating thus adding significant time and expense to each composite pole.

SUMMARY OF THE PRESENT INVENTION

To address the shortcomings presented in the prior art, the present invention provides an improved fire resistant composite pole to maximize the advantages of composite poles while reducing their susceptibility to heat and fire damage. The present invention also includes a method of creating improved fire-resistant composite poles as described herein.

According to a first preferred embodiment, a method of the present invention may include a first set of steps for laying down structural layers and intumescent infused resin coatings. The present invention then preferably includes steps for spirally wrapping the structural layers with an intumescent veil layer. On top of the intumescent veil, the present invention preferably further includes a step for applying a final intumescent infused coating.

According to alternative preferred embodiments, the present invention may alternatively include only the steps of applying the structural layers, the intumescent infused resin coatings and an outer intumescent veil. According to a further preferred embodiment, the present invention may alternatively include applying only the structural layers with intervening intumescent infused resin coatings. Further examples and variations of fireproofing poles and methods for creating such poles may also be used based on various combinations of the method steps and elements disclosed herein without limitation.

In accordance with a further preferred embodiment, a composite utility pole of the present invention may preferably include a composite structure having integrally bonded layers of resin impregnated fiberglass extending along the length of the pole created by the disclosed method of the present invention. According to this preferred embodiment, the composite structure of the pole may preferably include an intumescent layer formed with high temperature mineral fibers, exfoliating graphite, organic binders. and alumina trihydrate (ATH).

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

BRIEF DESCRIPTION OF THE DRAWINGS

Elements in the figures have not necessarily been drawn to scale in order to enhance their clarity and to improve the understanding of the various elements and embodiments of the invention. Furthermore, elements that are known to be common and well understood to those in the industry are not depicted in order to provide a clear view of the various embodiments of the invention. Thus, it should be understood that the drawings are generalized in form in the interest of clarity and conciseness.

FIG. 5A illustrates the exemplary utility pole of the present invention at a seventh step in the exemplary process.

FIG. 5B illustrates the exemplary utility pole of the present invention at an eight step in the exemplary process.

DESCRIPTION OF THE PREFERRED EMBODIMENTS

Aspects of the present invention will be explained with reference to exemplary embodiments and examples which are illustrated in the accompanying drawings. These descriptions, embodiments and figures are not to be taken as limiting the scope of the claims. Further, the word "exemplary" is used herein to mean "serving as an example, instance, or illustration." Accordingly, any embodiment described herein as "exemplary" is not to be construed as preferred over other embodiments. Additionally, well-known elements of the embodiments will not be described in detail or will be omitted so as not to obscure relevant details.

Where the specification describes advantages of an embodiment or limitations of other prior art, the applicant does not intend to disclaim or disavow any potential embodiments covered by the appended claims unless the applicant specifically states that it is "hereby disclaiming or disavowing" potential claim scope. Likewise, the term "embodiments" does not require that all embodiments of the invention include any discussed feature or advantage, nor that it does not incorporate aspects of the prior art which are sub-optimal or disadvantageous.

As used herein, the singular forms "a", "an" and "the" are intended to include the plural forms as well, unless the context clearly indicates otherwise. Additionally, the word "may" is used in a permissive sense (i.e., meaning "having the potential to'), rather than the mandatory sense (i.e. meaning "must"). Further, it should also be understood that throughout this disclosure, unless logically required to be otherwise, where a process or method is shown or described, the steps of the method may be performed in any order (i.e. repetitively, iteratively or simultaneously) and selected steps may be omitted. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

With reference now to FIGS. 1A-9B, the present invention teaches a system, method and apparatus for forming an improved, fire-resistant composite utility pole 10. As should be understood, the examples discussed herein are intended to be illustrative and any of a variety of alternative systems, embodiments and/or configurations may be used with the present invention without limitation.

Figure 1A:
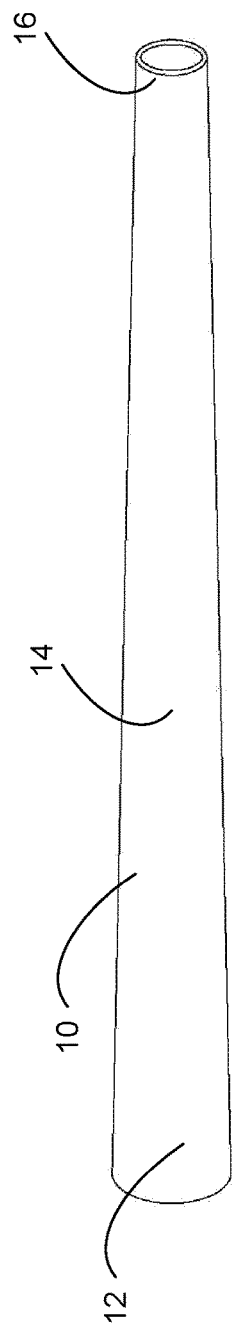
FIG. 1A is a schematic side view of an exemplary utility pole for use with the present invention.

With reference now to FIG. 1A, a schematic side view of an exemplary utility pole 10 in accordance with preferred embodiments of the present invention is provided. As shown, the exemplary composite utility pole 10 of the present invention preferably includes a hollow interior 18 which is enclosed within an outer length of pole. In the example shown in FIG. 1A, the utility pole 10 is tapered and extends from a wider base end 12 (i.e. larger circumference), through a tapered center portion 14, up to a narrower top end 16 (i.e. smaller circumference). According to alternative preferred embodiments, the utility pole 10 for use with and/or formed by the present invention may alternatively be entirely straight (i.e. untapered).

As discussed below, the body of the exemplary pole 10 is preferably formed from the systematic and repeated laying down of layers of resin and fiberglass. According to the present invention, any resin and fiberglass combination may be used. Further, the fiberglass may be in any of a variety of forms including single end or multi-end roving designs. According to a first preferred embodiment, the resin may be a resin such as DER 331 Epoxy Resin, Polyester F701 Resin or the like. According to a further preferred embodiment, the fiberglass used with the present invention may conform to any tex/yield specification which may be commercially available. For example, 450, 330, 250 or 112 YIELD GLASS or the like may be used without limitation. According to a first preferred embodiment, 330 YIELD GLASS may be used.

Figure 1B:
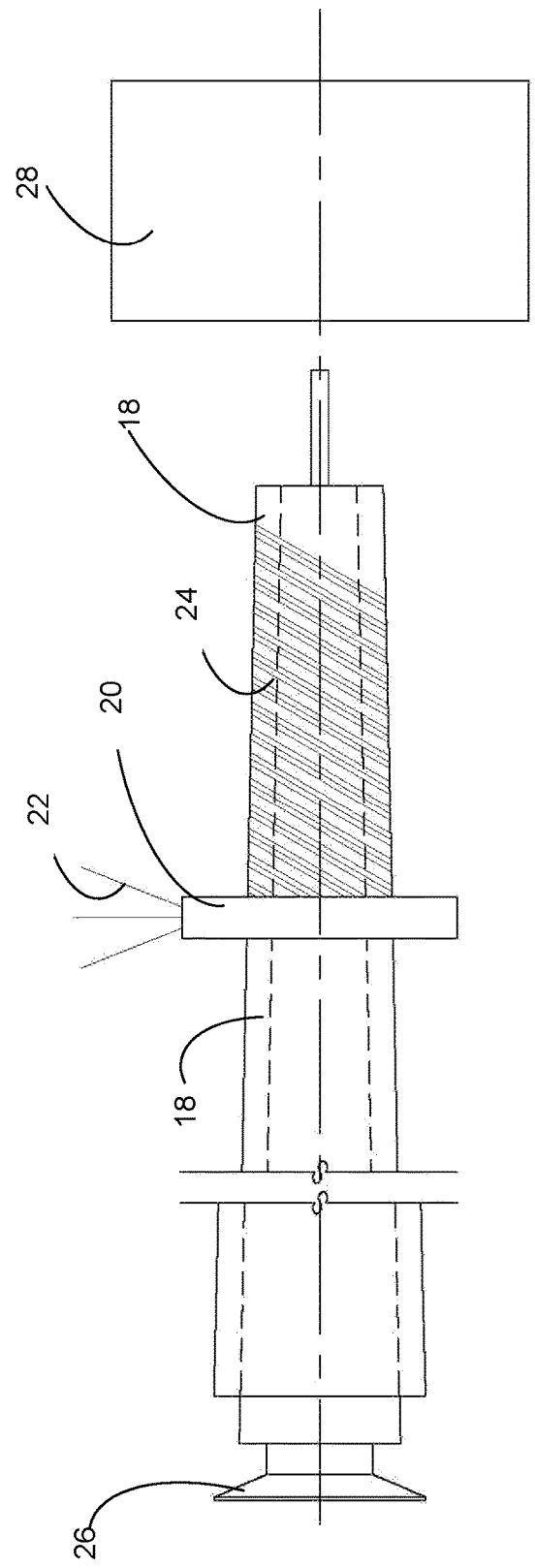
FIG. 1B is an elevational view of an exemplary apparatus for forming the novel composite pole of the present invention and for executing the exemplary method steps for forming the exemplary composite pole.

With reference now to FIG. 1B, an elevational view of an exemplary apparatus for forming the novel composite pole 10 of the present invention is provided. As shown, the present invention. As shown, the present invention may be formed on a mandrel 18 onto which layers of resin and fiberglass rovings 22 are applied to build the pole body. The mandrel 18 may be of any desired dimension. According to a preferred embodiment, the mandrel 18 may conform to the specification of a T-5225 mandrel or the like.

In the example shown, the mandrel 18 is preferably rotated between a support/ring winder 26 and a second support 28. As shown, as the mandrel 18 is rotated, the delivery ring 20 preferably moves back and forth laying down resin/fiberglass rovings/layers 24 in a helical fashion and at prescribed angles relative to the main axis of the pole 10/mandrel 18.

As discussed herein, the ring winding system shown in FIG. 1B is purely exemplary. Alternatively, other construction methods for executing the steps of the present invention may be used without limitation. For example, any filament winding system, pultrusion or centrifugal casting method may also be used. As discussed below, using filament winding, the fireproof layer is preferably wound into the part. In pultrusion, the fireproof layer may be incorporated as a standard veil or mat. In centrifugal casting, the fireproofing layer/veil may be layered into the layup at the same time as the normal veil.

Figure 2A:
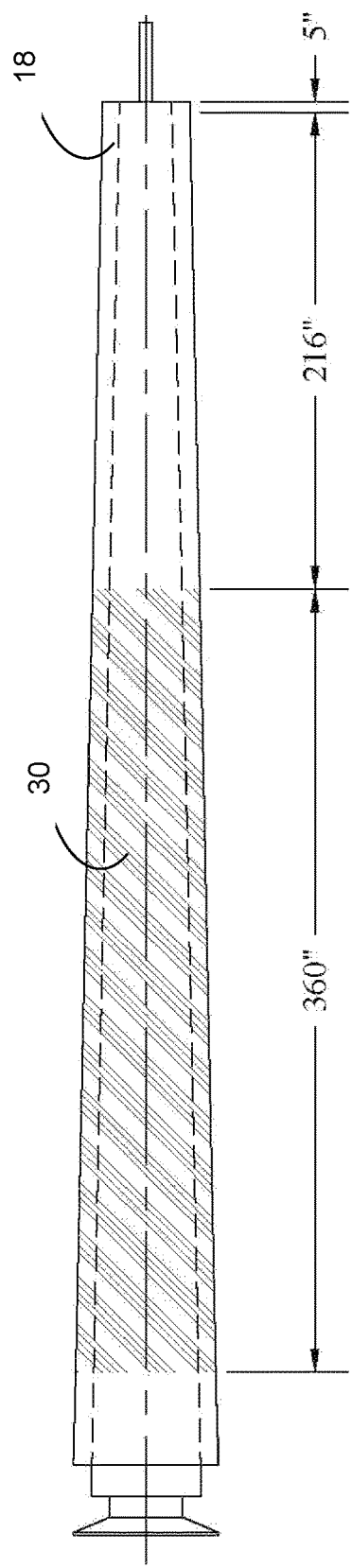
FIG. 2A illustrates an initial step in the process of forming the pole in accordance with a first preferred embodiment of the invention.

With reference now to FIG. 2A, the exemplary pole of the present is shown at an initial step in the exemplary fabrication process. As shown, at an exemplary first step, the winding system of the present invention preferably winds an initial layer of rovings 30 at a first angle (e.g. 0°-90°). According to a preferred embodiment, the initial layer of rovings 30 may be applied in 5-15 bands at an initial angle to produce a first layer length of 360" (ending approximately 216" from the top from the mandrel 18).

Figure 2B:
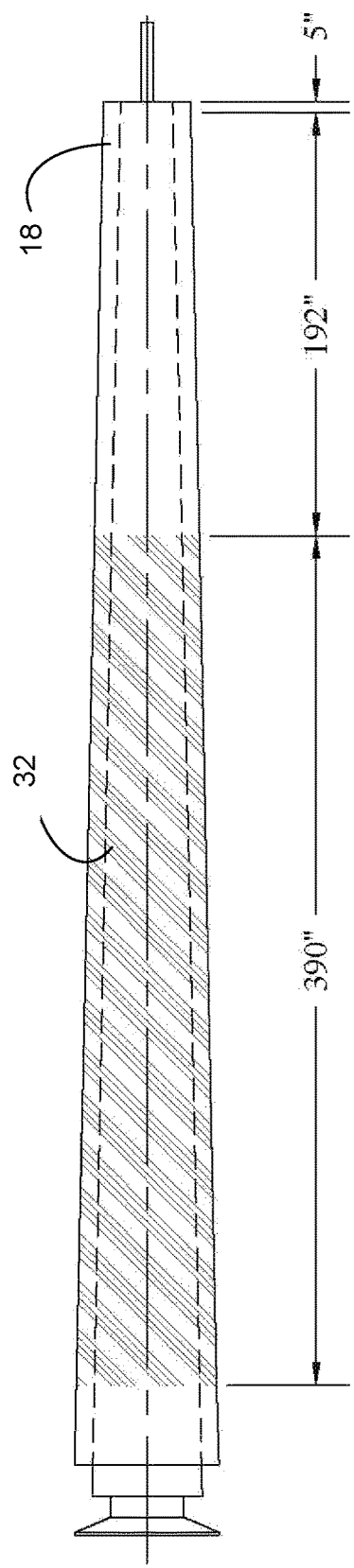
FIG. 2B illustrates the exemplary utility pole of the present invention at a second step in the exemplary process.

With reference now to FIG. 2B, at a second step in the exemplary process, the mandrel 18 is preferably indexed a given angle of 1°-30° (e.g. 15°) and thereafter the winding system preferably winds a second layer of rovings 32 onto the mandrel 18. According to a preferred embodiment, the second layer of rovings 32 may be applied in 5-15 bands to produce a second layer length of 390" (ending approximately 192" from the top from the mandrel 18).

Figure 3A:
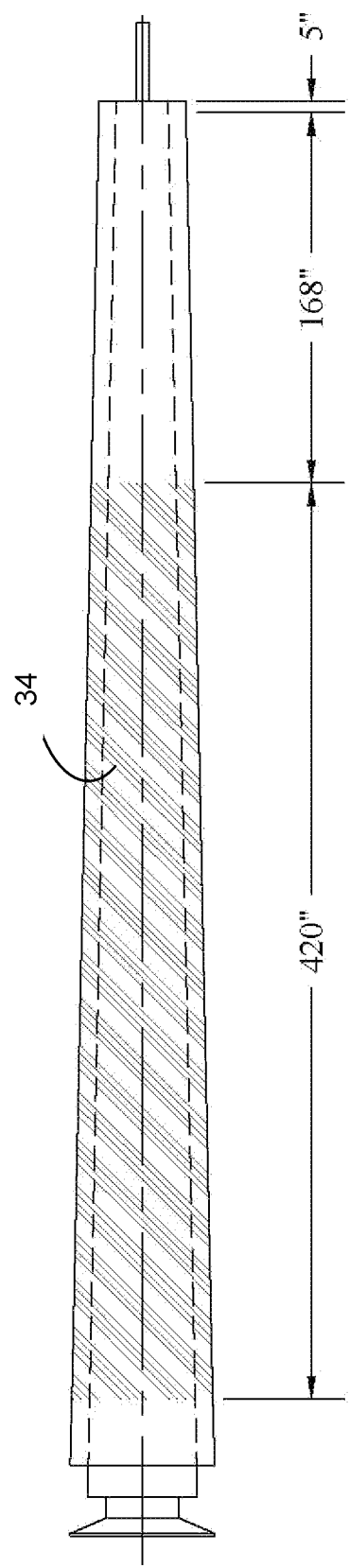
FIG. 3A illustrates the exemplary utility pole of the present invention at a third step in the exemplary process.

With reference now to FIG. 3A, at a third step in the exemplary process, the mandrel 18 is preferably indexed a given angle of 1°-30° (e.g. 15°) and thereafter the winding system preferably winds a third layer of rovings 34 onto the mandrel 18. According to a preferred embodiment, the third layer of rovings 34 may be applied in 5-15 bands to produce a third layer length of 420" (ending approximately 168" from the top from the mandrel 18).

Figure 3B:
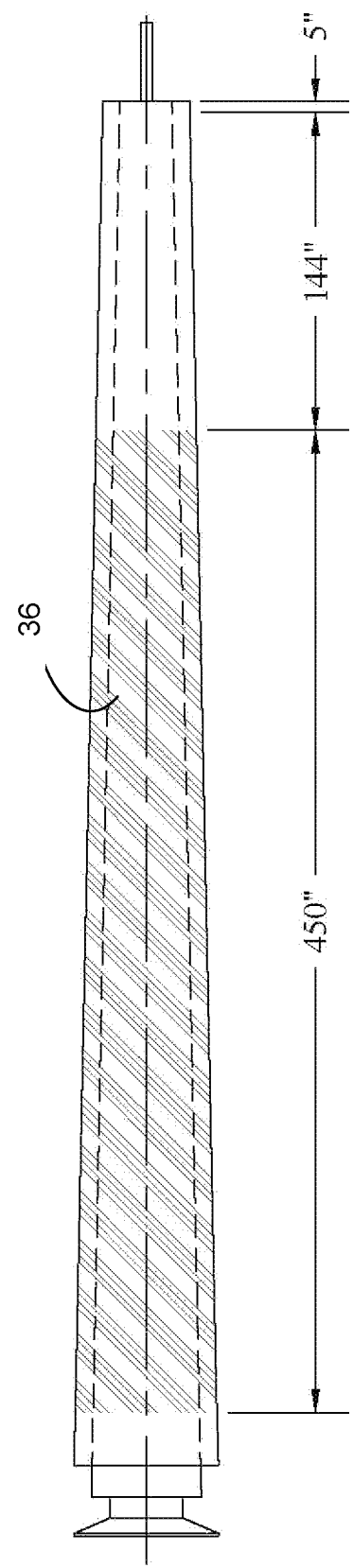
FIG. 3B illustrates the exemplary utility pole of the present invention at a fourth step in the exemplary process.

With reference now to FIG. 3B, at a fourth step in the exemplary process, the mandrel 18 is preferably indexed a given angle of 1°-30° (e.g. 15°) and thereafter the winding system preferably winds a fourth layer of rovings 36 onto the mandrel 18. According to a preferred embodiment, the fourth layer of rovings 36 may be applied in 5-15 bands to produce a fourth layer length of 450" (ending approximately 144" from the top from the mandrel 18).

Figure 4A:
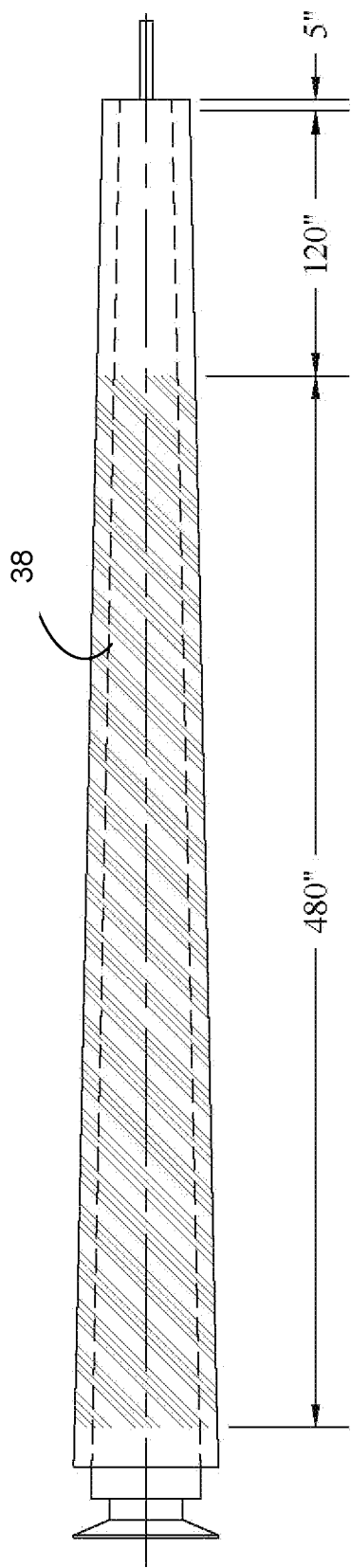
FIG. 4A illustrates the exemplary utility pole of the present invention at a fifth step in the exemplary process.

With reference now to FIG. 4A, at a fifth step in the exemplary process, the mandrel 18 is preferably indexed a given angle of 1°-30° (e.g. 15°) and thereafter the winding system preferably winds a fifth layer of rovings 38 onto the mandrel 18. According to a preferred embodiment, the fifth layer of rovings 38 may be applied in 5-15 bands to produce a fifth layer length of 480" (ending approximately 120" from the top from the mandrel 18).

Figure 4B:
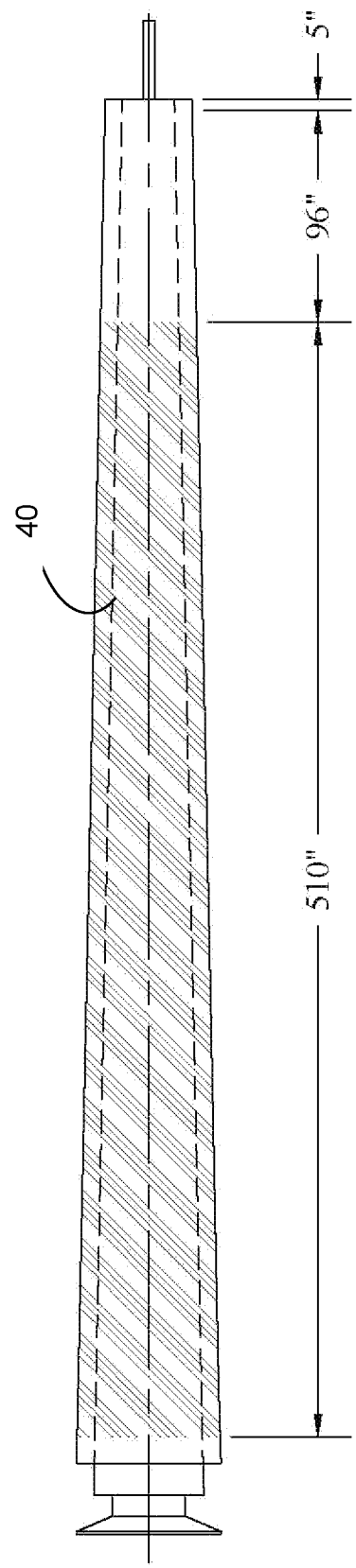
FIG. 4B illustrates the exemplary utility pole of the present invention at a sixth step in the exemplary process.

With reference now to FIG. 4B, at a sixth step in the exemplary process, the mandrel 18 is preferably indexed a given angle of 1°-30° (e.g. 15°) and thereafter the winding system preferably winds a sixth layer of rovings 40 onto the mandrel 18. According to a preferred embodiment, the sixth layer of rovings 40 may be applied in 5-15 bands to produce a sixth layer length of 510" (ending approximately 96" from the top from the mandrel 18).

With reference now to FIG. 5A, at a seventh step in the exemplary process, the mandrel 18 is preferably indexed a given angle of 1°-30° (e.g. 15°) and thereafter the winding system preferably winds a seventh layer of rovings 42 onto the mandrel 18. According to a preferred embodiment, the seventh layer of rovings 42 may be applied in 5-15 bands to produce a seventh layer length of 527" (ending approximately 85" from the top from the mandrel 18).

With reference now to FIG. 5B, at an eighth step in the exemplary process, the mandrel 18 is preferably indexed a given angle of 1°-30° (e.g. 15°) and thereafter the winding system preferably winds an eighth layer of rovings 44 onto the mandrel 18. According to a preferred embodiment, the eighth layer of rovings 44 may be applied in 5-15 bands to produce an eighth layer length of 608" (ending approximately 10" from the top from the mandrel 18).

Figure 6A:
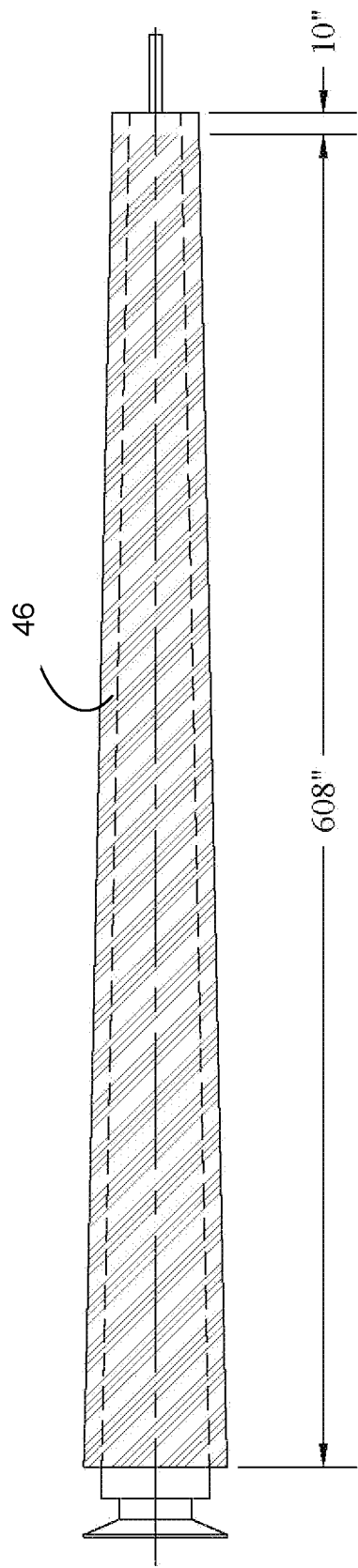
FIG. 6A illustrates the exemplary utility pole of the present invention at a ninth second step in the exemplary process.

With reference now to FIG. 6A, at a ninth step in the exemplary process, the pole is preferably spiral wrapped 46 along its entire length. Preferably, the wrapping layer 46 is made using a lead of 7.35"/REV to produce a ninth layer length of 608" (ending approximately 10" from the top from the mandrel 18).

Figure 6B:
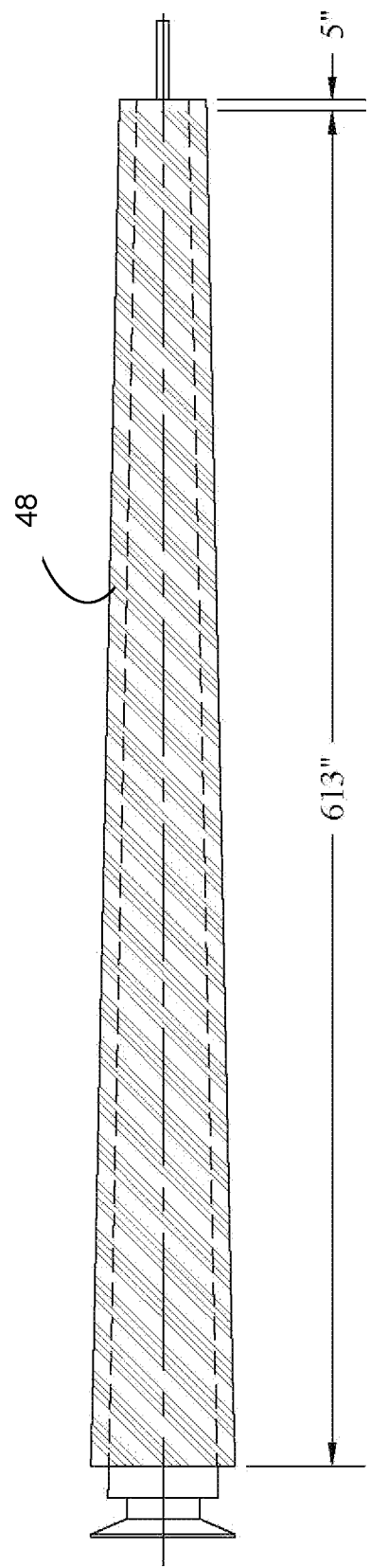
FIG. 6B illustrates the exemplary utility pole of the present invention at a tenth step in the exemplary process.

With reference now to FIG. 6B, at a tenth step in the exemplary process, the mandrel 18 is preferably indexed a given angle of 1°-30° (e.g. 15°) and thereafter the winding system preferably winds a tenth layer of rovings 48 onto the mandrel 18. According to a preferred embodiment, the tenth layer of rovings 48 may be applied in 5-15 bands to produce a tenth layer length of 613" (ending approximately 0-5" from the top from the mandrel 18).

Figure 7A:
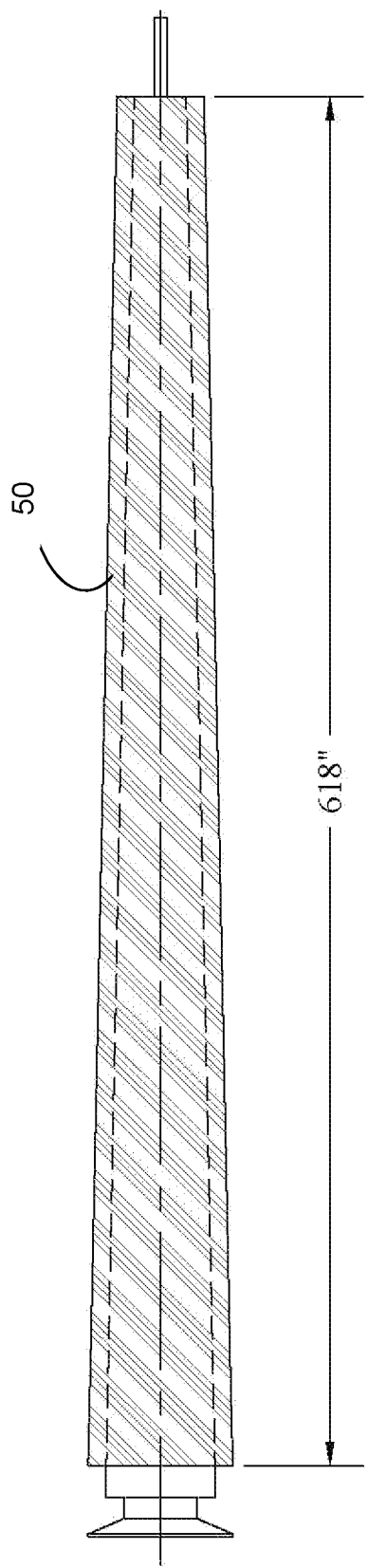
FIG. 7A illustrates the exemplary utility pole of the present invention at an eleventh step in the exemplary process.

With reference now to FIG. 7A, at an eleventh step in the exemplary process, the mandrel 18 is preferably indexed a given angle of 1°-30° (e.g. 15°) and thereafter the winding system preferably winds an eleventh layer of rovings 50 onto the mandrel 18. According to a preferred embodiment, the eleventh layer of rovings 50 may be applied in 5-15 bands to produce an eleventh layer length of 618" (ending approximately 0-5" from the top from the mandrel 18).

Figure 7B:
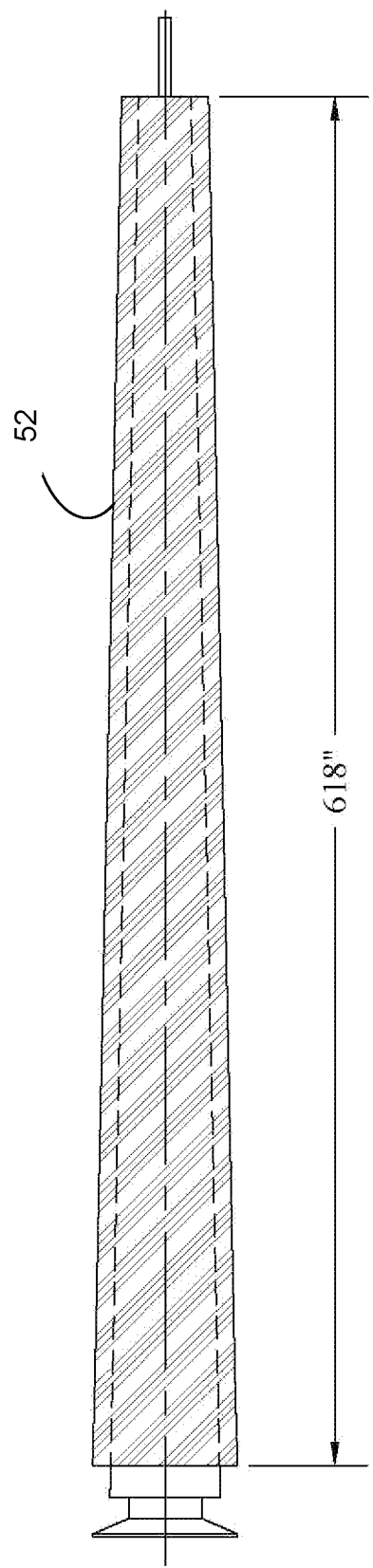
FIG. 7B illustrates the exemplary utility pole of the present invention at a twelfth step in the exemplary process.

With reference now to FIG. 7B, at a twelfth step in the exemplary process, the pole is then preferably again spiral wrapped 52 along its entire length. Preferably, the wrapping layer 52 is made using a lead of 7.35"/REV to produce a twelfth layer length of 618" (ending approximately 0-5" from the top from the mandrel 18).

Figure 8A:
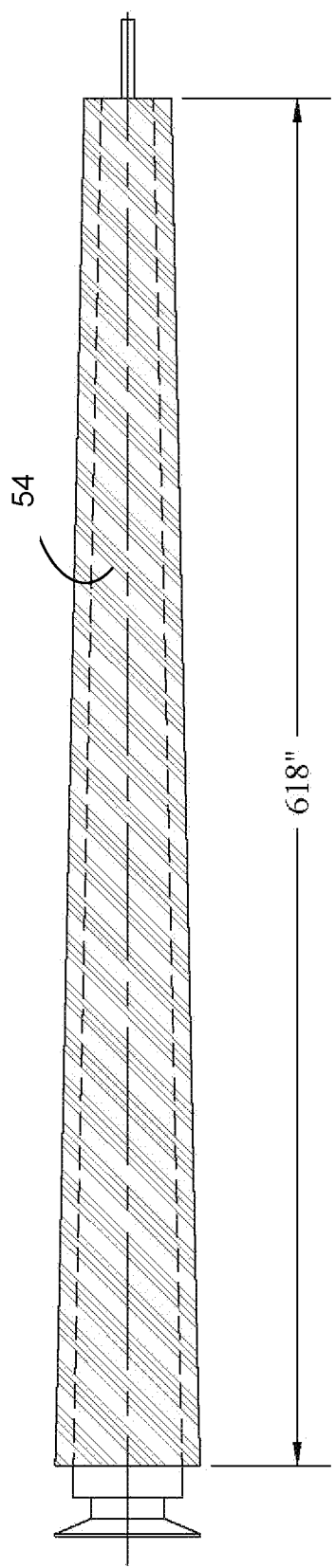
FIG. 8A illustrates the exemplary utility pole of the present invention at a thirteenth step in the exemplary process.

With reference now to FIG. 8A, at a thirteenth step in the exemplary process, the winding system preferably winds a thirteenth layer of rovings 54 onto the mandrel 18. According to a preferred embodiment, the thirteenth layer of rovings 54 may be applied in 5-15 bands to produce a thirteenth layer length of 618" (ending approximately 0-5" from the top from the mandrel 18).

Figure 8B:
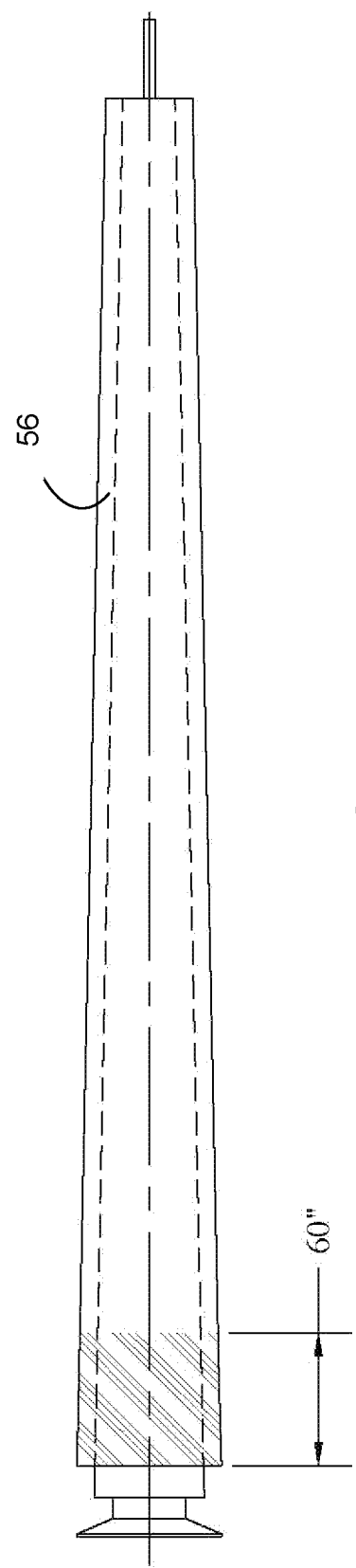
FIG. 8B illustrates the exemplary utility pole of the present invention at a fourteenth step in the exemplary process.

With reference now to FIG. 8B, at a fourteenth step in the exemplary process, the base of the pole is then preferably spiral wrapped 56. Preferably, the wrapping layer 56 is made using a lead of 1.0"/REV to produce a fourteenth layer length of 60" (ending approximately 558" from the top from the mandrel 18).

Figure 9A:
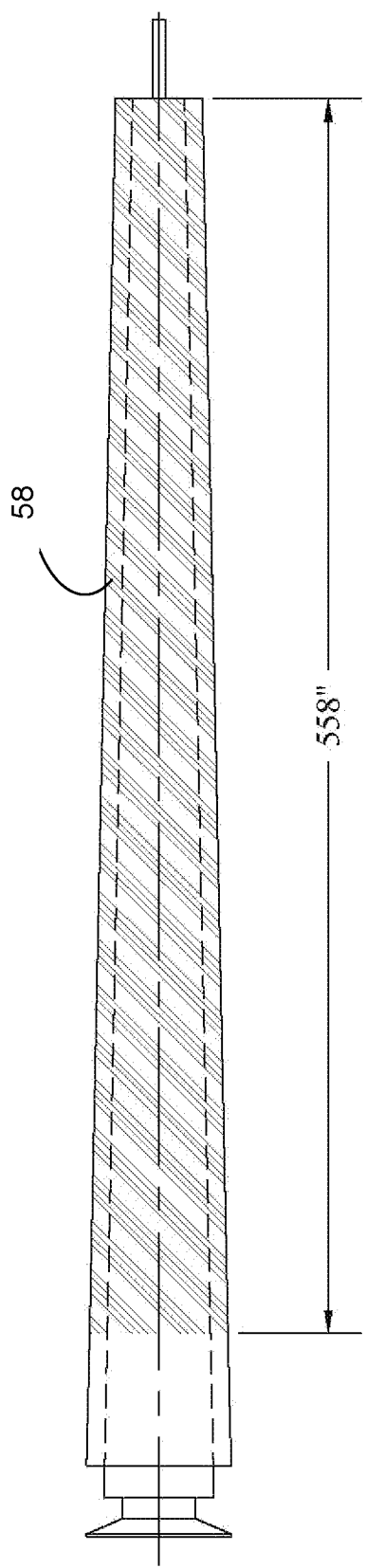
FIG. 9A illustrates the exemplary utility pole of the present invention at a fifteenth step in the exemplary process.

With reference now to FIG. 9A, at fifteenth step in the exemplary process, the upper length of the pole is then preferably spirally wrapped with a fire-proof surfacing veil. Preferably, the fire-proof surfacing veil 58 is applied with a lead of approximately 2.25 inches per revolution to produce a fifteenth layer having a length of 558" (starting at the top of the mandrel 18). According to a preferred embodiment, the fifteenth layer may alternatively extend the further down to cover the full length of the pole.

According to a preferred embodiment, the fire-proof surfacing veil is preferably formed of materials which may include high temperature mineral fibers, exfoliating graphite, and organic binders. According to a further preferred embodiment, the fire-proof surfacing veils may preferably further include active ingredients such as alumina trihydrate (ATH) to enhance performance. According to a further preferred embodiment, the fire-proof veil of the present invention may include a product which conforms to the specifications of an intumescent product such as TECNO-FIRE® or the like.

At a sixteenth step in the exemplary process, the upper length of the pole is then preferably coated with a fire-resistant coating. According to a preferred embodiment, the final coating is preferably an intumescent infused coating (e.g. a resin or paint coating infused with intumescent materials). For example, the final coating may include a fire retardant such as aluminum trihydroxide (ATH), which may be provided within a paint or resin to provide an outer coating of fire resistance.

According to a further preferred embodiment, the fire-retardant/intumescent chemical additives discussed herein may be infused within resins used for each step of the present invention. Alternatively, the intumescent chemicals may be infused within resins only within selected layers. For example, intumescent infused resins may be used for a single layer of material, every other layer of material, every third layer of material, every fourth layer of material or the like. According to a preferred embodiment, the intumescent infused resins may preferably be infused with ATH (or other fire-retardant additives) at a rate of 20% by volume or more.

Figure 9B:
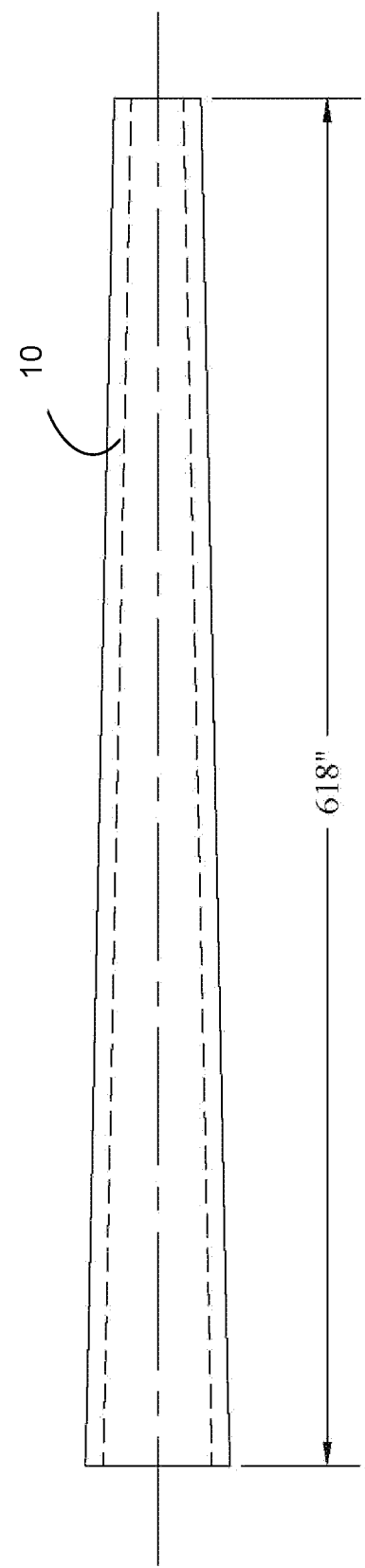
FIG. 9B illustrates the exemplary utility pole of the present invention at a sixteenth step in the exemplary process.

With reference now to FIG. 9B, at a next step, the exemplary pole 10 of the present invention may then preferably be cured, pushed off the mandrel 18 and cut to length.

As discussed above, the present invention includes a fireproof composite pole and a fireproofing method of creating a composite pole. According to a first preferred embodiment, the present invention includes a process including a first set of steps for laying down structural layers and intumescent infused resin coatings. The present invention then preferably includes steps for spirally wrapping the structural layers with an intumescent veil layer. On top of the intumescent veil, the present invention preferably further includes a step for applying a final intumescent infused coating.

According to alternative preferred embodiments, the present invention may alternatively include only the steps of applying the structural layers, the intumescent infused resin coatings and an outer intumescent veil. According to a further preferred embodiment, the present invention may alternatively include applying only the structural layers with intervening intumescent infused resin coatings. Further examples and variations of fireproofing poles and methods for creating such poles may also be used based on various combinations of the method steps and elements disclosed herein without limitation.

The present invention has been disclosed above with reference to several examples. These examples are not intended to be limiting. Instead, the scope of the present invention should be determined purely by the terms of the appended claims and their legal equivalents.

What is claimed is:

1. A method for forming a composite pole, the method comprising:
    rotating a mandrel between a first support and a second support;
    moving a delivery ring back and forth across the mandrel;
    laying down a resin layer and a layer of fiberglass rovings in a helical fashion and at prescribed angles relative to the main axis of the mandrel;
    wherein the resin and fiberglass layers are applied using filament winding; wherein the fireproof layer is wound into the applied layers; wherein the initial layer of fiberglass rovings is applied at an initial angle; wherein the initial comprises an angle between 0°-90°; wherein the initial layer of fiberglass rovings are applied in 5-15 bands at the initial angle to produce a first layer length of 360"; wherein the first layer ends approximately 216" from the top from the mandrel;
    changing the angle of the mandrel to a second angle; wherein the angle of the mandrel is moved 1°-30° to produce the second angle; and
    applying a second layer of fiberglass rovings onto the mandrel; wherein the second layer of fiberglass rovings are applied in 5-15 bands to produce a second layer length of 390"; wherein the second layer ends approximately 192" from the top from the mandrel.

2. The method of claim 1, wherein the method comprises:
    changing the angle of the mandrel to a third angle; wherein the angle of the mandrel is moved 1°-30° to produce the third angle;
    applying a third layer of fiberglass rovings onto the mandrel; wherein the third layer of fiberglass rovings are applied in 5-15 bands to produce a third layer length of 420"; wherein the third layer ends approximately 168" from the top from the mandrel.

3. The method of claim 2, wherein the method comprises:
    changing the angle of the mandrel to a fourth angle; wherein the angle of the mandrel is moved 1°-30° to produce the fourth angle;
    applying a fourth layer of fiberglass rovings onto the mandrel; wherein the fourth layer of fiberglass rovings are applied in 5-15 bands to produce a fourth layer length of 450"; wherein the fourth layer ends approximately 144" from the top from the mandrel.

4. The method of claim 3, wherein the method comprises:
    changing the angle of the mandrel to a fifth angle; wherein the angle of the mandrel is moved 1°-30° to produce the fifth angle;
    applying a fifth layer of fiberglass rovings onto the mandrel; wherein the fifth layer of fiberglass rovings are applied in 5-15 bands to produce a fifth layer length of 480"; wherein the fifth layer ends approximately 120" from the top from the mandrel.

5. The method of claim 4, wherein the method comprises:
    changing the angle of the mandrel to a sixth angle; wherein the angle of the mandrel is moved 1°-30° to produce the sixth angle;
    applying a sixth layer of fiberglass rovings onto the mandrel; wherein the sixth layer of fiberglass rovings are applied in 5-15 bands to produce a sixth layer length of 510"; wherein the sixth layer ends approximately 96" from the top from the mandrel.

6. The method of claim 5, wherein the method comprises:
    changing the angle of the mandrel to a seventh angle; wherein the angle of the mandrel is moved 1°-30° to produce the seventh angle;
    applying a seventh layer of fiberglass rovings onto the mandrel; wherein the seventh layer of fiberglass rovings are applied in 5-15 bands to produce a seventh layer length of 527"; wherein the seventh layer ends approximately 85" from the top from the mandrel.

7. The method of claim 6, wherein the method comprises:
    changing the angle of the mandrel to an eighth angle; wherein the angle of the mandrel is moved 1°-30° to produce the eighth angle;
    applying a eighth layer of fiberglass rovings onto the mandrel; wherein the eighth layer of fiberglass rovings are applied in 5-15 bands to produce an eighth layer length of 608"; wherein the eighth layer ends approximately 10" from the top from the mandrel.

8. The method of claim 7, wherein the method comprises:

changing the angle of the mandrel to a ninth angle; wherein the angle of the mandrel is moved 1°-30° to produce the ninth angle;

applying a ninth layer of fiberglass rovings onto the mandrel; wherein the ninth layer of fiberglass rovings are applied in 5-15 bands to produce a ninth layer length of 608"; wherein the ninth layer ends approximately 10" from the top from the mandrel.

9. The method of claim 8, wherein the method comprises:

changing the angle of the mandrel to a tenth angle; wherein the angle of the mandrel is moved 1°-30° to produce the tenth angle;

applying a tenth layer of fiberglass rovings onto the mandrel; wherein the tenth layer of fiberglass rovings are applied in 5-15 bands to produce a tenth layer length of 613"; wherein the tenth layer ends approximately 0-5" from the top from the mandrel.

10. The method of claim 9, wherein the method comprises:

changing the angle of the mandrel to an eleventh angle; wherein the angle of the mandrel is moved 1°-30° to produce the eleventh angle;

applying an eleventh layer of fiberglass rovings onto the mandrel; wherein the eleventh layer of fiberglass rovings are applied in 5-15 bands to produce an eleventh layer length of 618"; wherein the eleventh layer ends approximately 0-5" from the top from the mandrel.

11. The method of claim 10, wherein the method comprises:

changing the angle of the mandrel to a twelfth angle; wherein the angle of the mandrel is moved 1°-30° to produce the twelfth angle;

applying a twelfth layer of fiberglass rovings onto the mandrel; wherein the twelfth layer of fiberglass rovings are applied in 5-15 bands to produce a twelfth layer length of 618"; wherein the twelfth layer ends approximately 0-5" from the top from the mandrel.

12. The method of claim 11, wherein the method comprises:

changing the angle of the mandrel to a thirteenth angle; wherein the angle of the mandrel is moved 1°-30° to produce the thirteenth angle;

applying a thirteenth layer of fiberglass rovings onto the mandrel; wherein the thirteenth layer of fiberglass rovings are applied in 5-15 bands to produce a thirteenth layer length of 618"; wherein the thirteenth layer ends approximately 0-5" from the top from the mandrel.

13. The method of claim 12, wherein the method comprises:

spiral wrapping the base of the pole to form a wrapping layer; wherein the wrapping layer is made using a lead of 1.0"/REV to produce a fourteenth layer having a length of approximately 60"; wherein the wrapping layer ends approximately 558" from the top from the mandrel.

14. The method of claim 13, wherein the method comprises:

spiral wrapping the upper length of the pole with a fire-proof surfacing veil; wherein the fire-proof surfacing veil is applied with a lead of approximately 2.25 inches per revolution to produce a fifteenth layer having a length of 558".

15. The method of claim 14, wherein the fire-proof surfacing veil comprises high temperature mineral fibers, exfoliating graphite, and organic binders.

16. The method of claim 15, wherein the fire-proof surfacing veil comprises alumina trihydrate (ATH).

17. The method of claim 16, wherein the method comprises a next step of: applying a top layer of fire-resistant coating to the upper length of the pole.

18. The method of claim 17, wherein the top layer is an intumescent infused coating.

19. The method of claim 18, wherein the intumescent infused coating comprises resin infused with intumescent materials.

20. The method of claim 18, wherein the intumescent infused coating comprises paint infused with intumescent materials.

21. The method of claim 18, wherein the intumescent infused coating comprises aluminum trihydroxide (ATH).

22. The method of claim 21, wherein after the application of the intumescent infused coating, the composite pole is cured, pushed off the mandrel and cut to length.

* * * * *